United States Patent [19]

Halttula

[11] 4,329,813
[45] May 18, 1982

[54] SUBSTRATUS CRATE FOR PLANT CULTIVATION AND TRANSPORTATION

[75] Inventor: Jorma Halttula, Tampere, Finland

[73] Assignee: Aaltosen Tehtaat Oy Sarvis, Tampere, Finland

[21] Appl. No.: 156,234

[22] Filed: Jun. 3, 1980

[51] Int. Cl.³ .......................... A01G 9/02; A47F 3/14
[52] U.S. Cl. ......................................... 47/66; 47/1.1; 206/505; 211/126
[58] Field of Search ............................ 47/66, 39, 1.1; 211/126; 206/505-507; 108/51

[56] References Cited

U.S. PATENT DOCUMENTS

| | | |
|---|---|---|
| 3,118,249 | 1/1964 | Bard et al. ............................. 47/1.1 |
| 3,405,810 | 10/1968 | Rogus ................................... 211/126 |
| 3,407,960 | 10/1968 | Rogus ............................... 211/126 X |
| 3,534,866 | 10/1970 | Asenbauer .......................... 211/126 |
| 3,581,932 | 6/1971 | Kreeger et al. ................. 211/126 X |
| 3,842,534 | 10/1974 | Walters et al. ......................... 47/1.1 |
| 3,935,673 | 2/1976 | Robins .............................. 47/1.1 X |
| 4,211,327 | 7/1980 | Stahl et al. .......................... 206/505 |
| 4,251,951 | 2/1981 | Heinstedt ............................... 47/39 |

Primary Examiner—Robert E. Bagwill
Attorney, Agent, or Firm—Pollock, Vande Sande & Priddy

[57] ABSTRACT

The present invention relates to stackable crate assemblies for use in plant cultivation and transportation, each crate assembly including a latticed bottom member, a pair of side walls and a pair of end walls, respectively. Supporting legs and support protrusions extend in spaced relationship from each side wall. At least one and preferably both end walls connected to the bottom member by hinged joints to facilitate loading and unloading of the crates.

12 Claims, 8 Drawing Figures

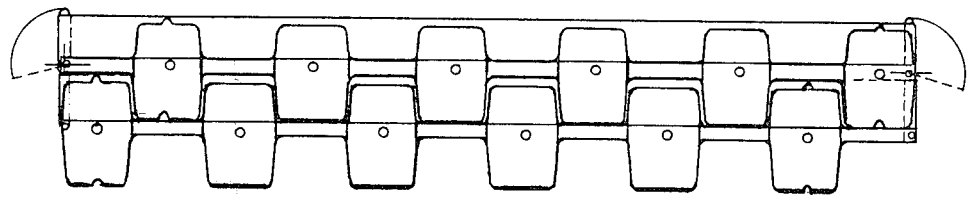
FIG. 4
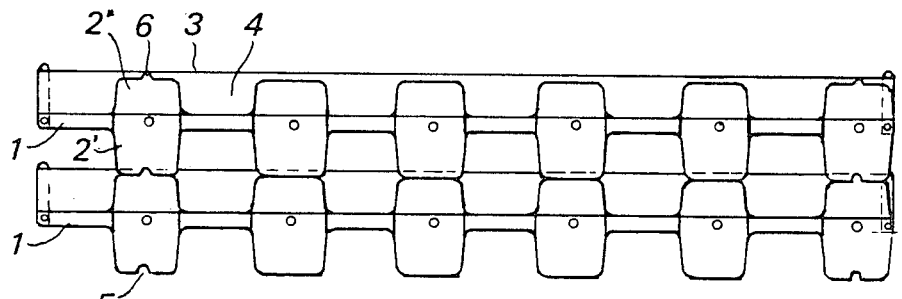
FIG. 5
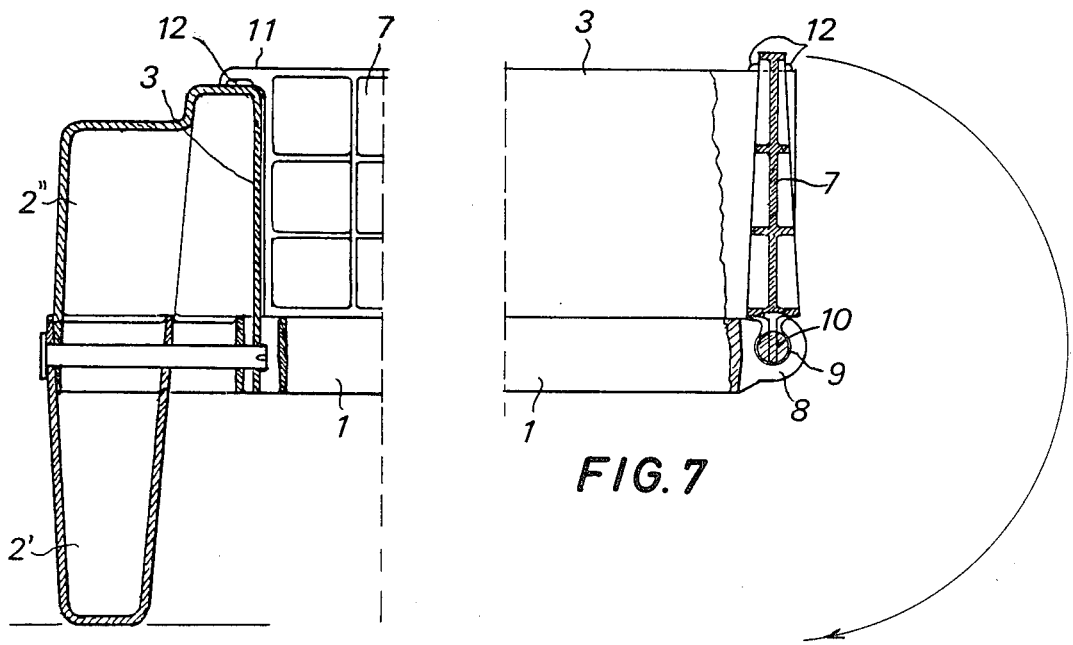
FIG. 6
FIG. 7

SUBSTRATUS CRATE FOR PLANT CULTIVATION AND TRANSPORTATION

BACKGROUND

The invention concerns a plant substratum crate of particularly use in the cultivation and transport of arboriculture plants.

Various transport stages have been known which are used specifically for transportation and moving of goods to storage and from storage to the buyers of the good. The elements associated with known stage structures allow the storage to be piled one upon another and joined with each other, keeping the stages exactly one on top of another thereby preventing them from sliding off-stack. Such stage and case structures are likewise known per se, the structures often designed to be piled and when piled as empty capable of fitting into a low space. Likewise, when the structures are loaded they can be piled i.e. stacked so that the cases are settling down higher in regard to each other, when in the cases or on the stages will remain enough space for storing.

Recently, an idea has been increasingly adapted for plant cultivation, for reforestation and also for horticulture, according to which the plants are grown in special cases, into which the same growth bed i.e. substratum is placed. It is endeavoured to further develop such a method whereby the plants would be delivered to the shops in the same cases, resulting in considerable handling and transport costs being saved. However, the existing stages and cases have not been satisfactory. Generally the defect has been the shape, require much space in use as well as during the transport, when piled one upon another. An additional drawback has been the poor durability of the structure taking mainly into consideration the transport of fully loaded cases piled one upon another. There exist another drawback; due to the case i.e. stage structure the effective space for the plants, when transported as piled is insufficient.

OBJECTS OF PRESENT INVENTION

An object of this invention is to create a new kind of a case for transportation of the plants and substratum for the plants, with such a case, not having any of the mentioned defects associated with known cases. This provides a crate most suitable for cultivation and transportation of plants, particularly for forest planting, when during the handling and transportation economical mechanical hoisting equipment can be used e.g. a truck etc. An object is to create such a transport stage i.e. substratum crate for plants, the same being piled one upon another as rigidly as possible so that the strain of piling would be divided favourably among the cases/crates enduring the heavy load. In addition, it is meant that the piling and grabbing devices would be intercontrolable, wherein the piles i.e. stacks would not tumble down even during the transport and swaying of the vehicle. It is also an object that the case/crate i.e. substratum of the plants be easy to unload and the structure allow air to enter below the crate and flow through the bottom into the substratum.

In order to achieve the previously mentioned as well as other purposes a unique substratum crate is described in detail in the following portion of the specification and is further defined in the claims.

SUMMARY OF THE INVENTION

According to the preferred embodiment of the invention, at least on two opposite sides, adjacent to the side wall, base blocks of equal height at equal intervals in regard to the bottom, mainly perpendicularly reaching, have been moulded or arranged, the width of which in the lateral direction is approx. the half of the block division clearance. The base blocks have been fitted on the side length so that by piling one upon another, and turning to 180° on the level, the base blocks i.e. legs are interlocking while the ends of the cases/crates are positioned face to face. In connection with the base blocks, stop pins or similar have been placed about to the middle, with blocks during piling are catching the base blocks i.e. legs of the top case/crate, fitting between the base blocks when the piling occurs densely for transportation as empty and each other case/crate being turned to 180° on the level. At least of two base blocks the lower and upper surface has been shaped to lay within each other, and a corresponding dent, due to which the crates during piling will fit so that the frontal surfaces of the base blocks will face each other during piling while the crates are loosely piled. Accordingly the clearance between each crate bottom and the bottom of the top crate will be so high as to allow plants on the crate during the transportation or storing. A further feature of the invention is that the bottom of the crate forms a latticework or similar structure pervious to air. This is favorable for the plants on the crate, since they require proper airing. There is still an additional characterizing feature; at least one of the crate end flanks is hinged at its lower edge so that it can be folded open, with the edge at the end remaining free, in which case e.g. a mechanized plant unloading method can be easily used in connection with the planting, if the corresponding components of the planting machine are mounted to accept automatically the plants to be planted directly from the crate.

BRIEF DESCRIPTION OF THE DRAWINGS

The invention is illustrated further in the following description where a preferred mode for the invention has been presented with reference to the enclosed drawings, of which:

FIG. 4 shows two crates according to FIG. 1, piled one upon another so that the base blocks are interlocking, as seen from a side, FIG. 5 shows two crates according to FIG. 1, piled one upon another so that the base blocks will match one upon another, as seen from a side, FIG. 6 shows the section A-A from a side part of the crate, a partial section from FIG. 1 in a larger scale, FIG. 7 shows a partial section of the hinged end side, as seen from a side.

DETAILED DESCRIPTION OF PREFERRED EMBODIMENT

Figure 1:
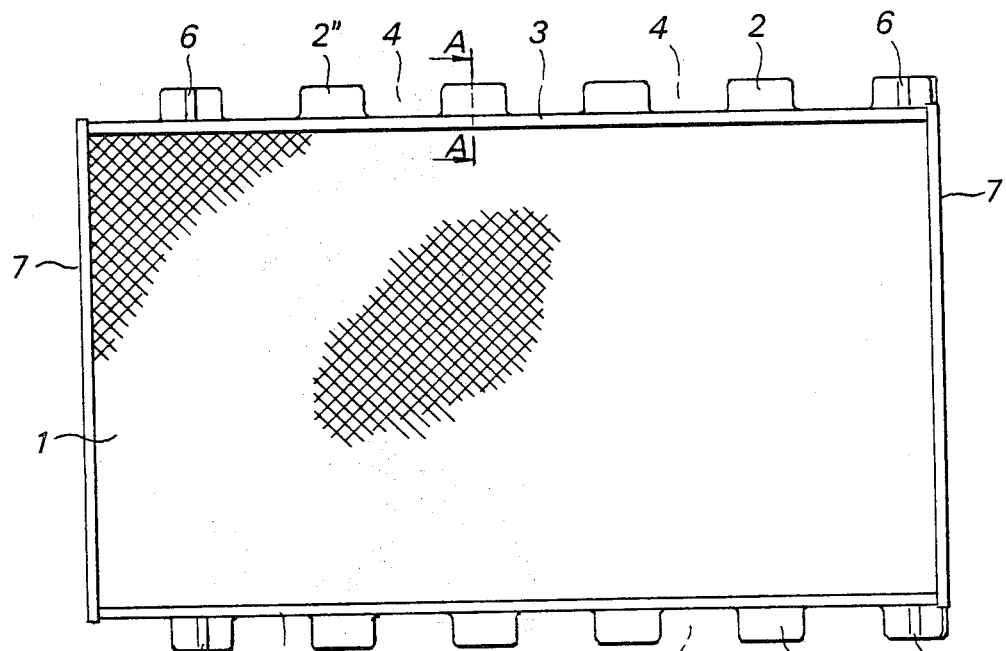
FIG. 1 shows a top view of a substratum and transportation crate for plants formed according to the invention.

The substratum crate, shown in the drawings according to the invention, is manufactured most advantageously of some suitable moisture-and corrosion-proof, weather-resistant plastic raw-material by a known method per se, such as by die-casting or moulding, preferably in parts to be assembled to form the crate in question.

According to this invention the crate consists of a lattice bottom 1, the free level of which consists of a dense lattice construction, with ribs facing each other perpendicularly in approx. 45° angle towards the sides. The ribs can be divided into approx. 15–20 mm distances and in height of approx. 25 mm and the free bottom space can be about 650×1200 mm. Into the lower edge of the bottom long sides six leg pieces or base blocks 2' have been attached to the side direction at equal intervals, the leg pieces being preferably parts of the bottom, reaching approx. 80–100 mm below the lower edge of the lattice bottom. They have a rectangular cross-sectional shape and are slightly tapered in a downwardly direction partly in order ensure easier attachment of the part by demoulding and partly to improve the crates of piling as described further on. The leg pieces 2' have been placed somewhat. i.e. about as much as ½ of a division, asymmetrically along the side, to facilitate piling. The side flanks 3 of the long side direction, approx. 80 mm of height, have been separately formed and attached to the bottom edge above the mentioned base blocks 2'. At the point of the base blocks in these side flanks there are protrusions 2", corresponding the shape of the base blocks 2', tapering correspondingly slightly upward. The upper surface of these protrusions 2" is straight and flat in order to give a supporting surface to the base blocks 2' while the substratum crates are piled high one upon another (FIG. 5). The upper edge of the side flank 3 reaches somewhat above the upper surface of the protrusion 2", when this upper edge is creating a side support for the base blocks of the top crate during piling. Between the protrusions 2" there will remain intermediate spaces 4, which are bordered by the wall parts of the protrusions 2" facing each other and also by the bottom surface parts of the crate between these wall parts. Into these intermediate spaces 4 the blocks 2' of the top crate are fitting during dense piling, when the crates are turned horizontally into 180° in regard to each other, the ends of the crates being squared (FIG. 4).

On the lower surface of two base blocks 2' dents 5 have been made and correspondingly on the upper surfaces of the protrusions 2" above them a moulding bead or filler 6 have been made, wherein the beads or filler 6 of one crate are adaptable for insertion into corresponding dents 5 of a further crate stacked thereon. Since the upper edges of flanks 3 are slightly higher than the protrusions 2" surfaces, flanks 3 support the crate legs, allowing the legs to remain stable even in a high pile. When the piling is taking place densely and in layers the stability is even better, since the legs are interlocking rather deeply.

Figure 2:
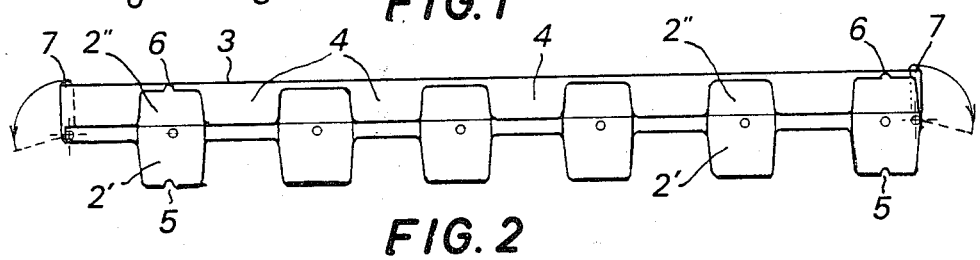
FIG. 2 shows the crate according to FIG. 1, as viewed from the longer side in a side delineation.
Figure 3:
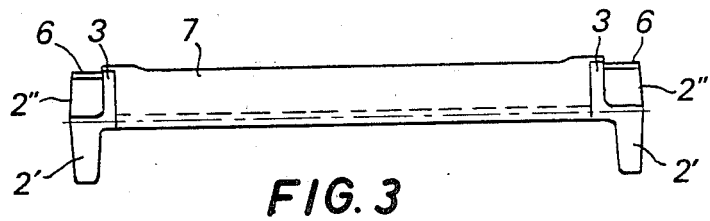
FIG. 3 shows the crate according to FIG. 1, looked at from the end side—in a front delineation.

According to the invention the end borders 7 are hinged at the crate edges so that the same can be opened and folded out- or downwards (FIG. 2). Into the border 7 of the bottom part 1, protruding juts 8 are formed, with each jut 8 defining a partly open bearing hole 9. At the lower edge of the folding side there are respective dents and in these the fulcrum pin 10, the same of which fits into the mentioned hole 9, with the top part of the aperture being slightly resilient, allowing the pin to snap into it's position and allowing the end side to be easily removed, if necessary. The end side's upper edge can be also locked to the side flanks 3, by protruding juts 11 formed on the upper edges in the folding end side, which juts 11 flexibly catch between notches 12 formed on the side flank edge. The hinged end side facilitates the removal of plants from the crates for instance during mechanical unloading.

Due to the raw material saving aspects and also to get the structure also otherwise light-weighted but still stable the bottom, functioning as a framework, has been latticed. A partial reason for this has been also the fact that the airing through the bottom structure is desirable, it being significant for the thriving of the plants to be cultivated and transported in the crates. Also, the part of the crates, hidden in the pictures, inside the side parts, is preferably latticed. The base blocks 2', related to the bottom structure as well as the side flanks 3 with their protrusions, are of a shell structure, widely used in plastic techniques, it being suitably braced to be solid and rigid by the supporting ribs (FIG. 6).

Figure 8:
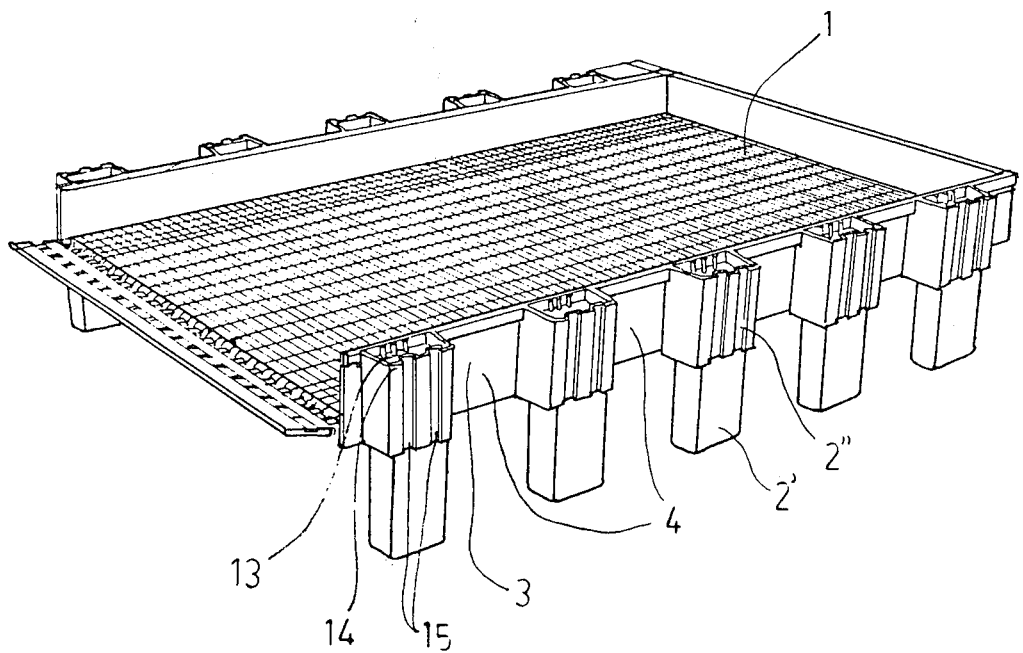
FIG. 8 shows a perspective view of another embodiment of the crate for plants formed according to the invention.

The embodiment of the crate according to FIG. 8 differs from the embodiment in FIGS. 1–7 only in manufacturing details and sight. The basic ides of the invention can clearly be recognized in the embodiment in FIG. 8.

The method of production of the crate in FIG. 8 differs from the first embodiment so that the lattice bottom 1, leg pieces 2' and side flanks 3, protrusions 2" have been made of one part by die-casting or moulding, whereat the leg pieces 2' and protrusions 2" are of a shell structure. The upper surfaces 13 of the protrusions 2" which take the leg pieces 2' of the upper crate when piling the crates, is a plate 13 which is made separately and pushed inside the protrusions 2 to such depth that the upper part of the protrusions 2" forms the edge 14 to take and to lock the lower part of the leg piece 2' when piling the crates. The inner dimensions of the edge 14 as well as its sectional form corresponds the dimensions and form of the lower part of the leg piece 2' f.ex. quadratangular so that the leg pieces can go a little inside the protrusions 2" between the edge 14. Inside the protrusions a flange has been arranged to take the plate 13.

Outer surface of each protrusion 2" has two vertical grooves 15 to make the construction rigid. The end walls or at least one of them, are hinged to be folded downwards, with the hinged walls being made of separate parts. The ribs of the bottom lattice face each other perpendicularly and extend parallel or perpendicular with regard to the sides of the rate. This embodiment has six protrusions 2" and correspondingly six leg pieces 2'.

This embodiment has the same features as the first embodiment as far as the use of the crate is concerned. The legs are attached to the side at equal intervals, similarly the legs are placed longitudinally asymmetric in regard to the sides to allow the same piling possibilities.

By employing the base block leg constuction of the substratum crate formed according to the invention, many special technical advantages are reached, the same of which, particularly in regard to the crate purpose, are advantageously effecting. Due to the use of several, separate legs the weight (even 400 kg) caused by the crate load, is divided equally and favorably so to provide lasting construction. During storing and transportation it is possible to stack/pile at least 5-6 layers of these crates, filled with plants, when the lowest crate is strained by a load until 2000 kg, when it is of importance that the counter-surfaces, bearing the load of the legs, are sufficiently large and plane. Due to the fact that separate and e.g. uniform straight supporting border is used, offers the advantage that the airing of the substratum is improved, but makes likewise possible to pile as well interlocking as one upon another, when the piling is performed very stable, lasting also during the transportation. In order to secure the piled composition it is possible to use particular fastenings or ties.

The substratum crate according to the invention, creates a considerable improvement particularly during the handling of plants for forest planting, compared to the previously used contrivances.

By employing the substratum crates formed according to the invention, plants can be handled and transported in at least 5 crates at the time, thus considerably shortening the working time. The hoisting and transport can be performed e.g. by a truck. The transport of empty crates is very easy, since they are light of weight and can be piled densely and staggered.

Due to the plastic construction the crate is also very resistent against different corrosion effects, caused by moisture, weather, soil and vital functions of the plants.

The dimensions and shape of the substratum crate according to the invention can, of course, deviate from the above description. The shape of the crate sides can be made so that the crates can be placed also side by side somewhat staggered. In such a case dents are made into the parts between the base blocks, when the side parts of the adjacently placed crates are partly staggered, as the base blocks fit into the base block dents of the adjacent crate. The advantage of this is that on the same surface area more crates can be placed.

The crate according to the invention can otherwise differ within the enclosed patent claims.

We claim:

1. A substratum crate assembly for use in plant cultivation and transportation, comprising:
    a latticed bottom member of substantially rectangular configuration with a pair of side walls and a pair of end walls surrounding and extending substantially perpendicular to said latticed bottom member;
    a plurality of spaced supporting legs exending downwardly from each side wall for supporting said latticed bottom member above a floor surface and the like, wherein supporting legs mounted on one side wall are asymmetrically disposed relative to further supporting legs mounted on a further, parallel extending side wall;
    each side wall further including outwardly extending support protrusions each vertically aligned with a support leg mounted on said respective side wall, each protrusion having a substantially flat upper surface facing away from said bottom member for supporting a supporting leg of a further crate assembly piled on said crate asembly; and
    hinge means joining at least one of said end walls to said latticed bottom member for pivoting said at least one end wall to a position extending substantially parallel to said latticed bottom member to facilitate loading and unloading of said crate assembly.

2. A substratum crate assembly according to claim 1, wherein each of said side walls extends in a vertical direction beyond the substantially flat upper surfaces of said support protrusion attached to said respective side wall.

3. A substratum crate assembly according to claim 1, wherein adjacently disposed supporting legs are spaced from one another by intermediate spacings sufficient in size to allow insertion of further supporting legs therebetween when a further substratum crate assembly is stacked such that a first side wall of said further crate assembly is substantially vertically aligned with a second side wall of said crate assembly.

4. A substratum crate assembly according to claim 3, wherein each of said intermediate spacings has a width slightly greater than a width of a supporting leg inserted therein.

5. A substratum crate assembly according to claim 1, wherein at least two of said supporting legs mounted on a side wall are each formed with a dent extending into a lower surface facing away from said bottom member,
    at least two said protrusions mounted on a side wall and vertically aligned with said at least two supporting legs are each formed with a ridge projecting in a vertically upwardly direction, whereby said ridges in said crate assembly are adaptable for insertion into dents formed in a further crate assembly stacked such that a first side wall of said further crate assembly is substantially vertically aligned with a first side wall of said crate assembly.

6. A substratum crate assembly according to claim 1, wherein each support protrusion defines a recess of sufficient size to receive a support leg of a further crate assembly stacked thereon.

7. A substratum crate assembly according to claim 1, wherein each of said supporting legs and each of said supporting protrusions tapers in size as the vertical distance from said bottom member increases.

8. A substratum crate assembly according to claim 1, wherein said hinge means comprises a separate bracket jutting out from opposite sides of said bottom member, each bracket having a substantially C-shaped opening pivotally supporting a fulcrum pin attached to a vertically lower portion of an end wall, thereby allowing said pivot pin to pivot within said opening as required to move said end wall toward or away from said respective side walls.

9. A substream crate assembly according to claim 20, wherein said hinge means are arranged for pivotally joining each end wall to said latticed bottom member.

10. A substratum crate assembly according to claim 20, wherein said at least one end wall includes locking flanges overlapping each side wall when said end wall is pivoted to a fully upright position, and each side wall also includes a notch formed in an upper surface, whereby each of said locking flanges releasably engages a separate notch to secure said end wall in said fully upright position.

11. A substratum crate assembly according to claim 1, wherein said latticed bottom member and said supporting legs are of unitary construction, with said side walls and support protrusion being attached to said bottom member by fastening members.

12. A substratum crate assembly according to claim 1, wherein said latticed bottom member, said supporting legs, said support protrusions and said side walls form a single, unitary member.

* * * * *